US 6,668,484 B2
United States Patent
Riccobene (10) Patent No.: US 6,668,484 B2
(45) Date of Patent: Dec. 30, 2003

(54) GARDEN EDGING SYSTEM

(75) Inventor: Thomas S. Riccobene, Albuquerque, NM (US)

(73) Assignee: Riccobene Masonry Company, Inc., Albuquerque, NM (US)

( * ) Notice: Subject to any disclaimer, the term of this patent is extended or adjusted under 35 U.S.C. 154(b) by 0 days.

(21) Appl. No.: 10/046,003

(22) Filed: Oct. 27, 2001

(65) Prior Publication Data

US 2002/0112399 A1 Aug. 22, 2002

Related U.S. Application Data

(63) Continuation-in-part of application No. 29/131,131, filed on Oct. 12, 2000.

(51) Int. Cl.$^7$ .................................................. A01G 1/08
(52) U.S. Cl. ......................... 47/33; 52/572; 52/747.12; 256/19
(58) Field of Search ................... 404/7, 8, 41; 403/375; 47/33; 446/69, 125; 52/747.12, 569, 570, 571, 572; 256/19; D8/1; D21/484, 500, 503, 504, 486, 501, 502; D25/113–118

(56) References Cited

U.S. PATENT DOCUMENTS

| | | | | |
|---|---|---|---|---|
| 696,792 A | * | 4/1902 | Bedell | ........................... 404/7 |
| 1,870,102 A | | 8/1932 | Davies | |
| 2,605,681 A | | 8/1952 | Trief | |
| 3,289,349 A | * | 12/1966 | Valdez | ........................... 47/33 |
| 3,537,687 A | | 11/1970 | Adelman | |
| 3,947,192 A | * | 3/1976 | Rosenberger | ................. 404/41 |
| 4,107,894 A | | 8/1978 | Mullins | |
| 4,125,341 A | * | 11/1978 | Reinschutz | .................. 404/41 |
| 4,884,920 A | | 12/1989 | Perazzi | |
| 5,003,746 A | | 4/1991 | Wilston | |
| 5,080,523 A | | 1/1992 | Steiner | |
| 5,119,587 A | | 6/1992 | Waltz | |
| 5,154,032 A | | 10/1992 | Ritter | |
| 5,168,678 A | * | 12/1992 | Scott et al. | .................... 52/102 |

(List continued on next page.)

FOREIGN PATENT DOCUMENTS

| | | | | | |
|---|---|---|---|---|---|
| CH | 653721 A | * | 1/1986 | ............. | E01C/5/06 |
| DE | 3308512 A1 | * | 9/1984 | ............. | E01C/5/06 |
| DE | 4137814 A1 | | 5/1993 | | |
| GB | 460051 | | 1/1937 | | |
| IT | 345117 | | 12/1936 | | |
| NL | 110004 | | 11/1964 | | |

OTHER PUBLICATIONS

Rockwood® Retaining Wall Systems advertisement for The Classic Edge by Rockwood®; 1997.
LVS Pavement Company advertisement for Pavestone® Co. Modular Concrete Beauty™.

(List continued on next page.)

Primary Examiner—Charles T. Jordan
Assistant Examiner—Tara M Golba
(74) Attorney, Agent, or Firm—Greer, Burns & Crain, Ltd.

(57) ABSTRACT

A garden edging system is made up of (a) one or more straight edger units, (b) one or more curved edger units and (c) one or more corner units. Each unit has a connecting face at each of its ends for connecting and holding adjacent units in end-to-end alignment with one another. The connecting faces facilitate the layout of a myriad of garden edging designs. The curved units have both their convex side and their concave side formed on the same arc of curvature so that a plurality of the units may be nested together with the concave side of each unit engaged flush against the convex side of the next adjacent unit. This facilitates packing and shipping of the units and mitigates against damage to the units. The units are dimensioned and sized to be stronger, more damage resistant, more versatile and more user-friendly than conventional edger bricks or tiles. A process of making the edger units is also disclosed.

15 Claims, 8 Drawing Sheets

U.S. PATENT DOCUMENTS

| | | | |
|---|---|---|---|
| 5,259,154 A | | 11/1993 | Lilley |
| 5,342,142 A | * | 8/1994 | Barth et al. .................... 404/41 |
| 5,348,417 A | * | 9/1994 | Scheiwiller .................. 404/41 |
| 5,441,364 A | | 8/1995 | Dressler |
| 5,548,938 A | | 8/1996 | Scheiwiller |
| D385,635 S | * | 10/1997 | Nebelsieck .................. 404/41 |
| 6,102,374 A | * | 8/2000 | Macri .......................... 256/24 |
| D448,858 S | * | 10/2001 | Azar ......................... D25/113 |
| D459,006 S | * | 6/2002 | Staten et al. ............... D25/113 |
| D464,742 S | * | 10/2002 | Gregori .................... D25/118 |

OTHER PUBLICATIONS

Sears Special Home Improvement Catalog, "Straight Scalloped Lawn Edging;" Item No. 3, p. 136.

K–Mart, Martha Stewart Garden Catalog; "Straight Scalloped Lawn Edging;" Mar./Apr. 1999.

Lowe's Home Improvement Warehouse; "Natural Scalloped Lawn Edging;" Item No. 50656; Jul. 1999.

Pavestone® catalog; "Scallops;" May 2000.

Pave Tech; World Wide Web; copy of home page advertisement; Sep. 2000.

* cited by examiner

GARDEN EDGING SYSTEM

CROSS-REFERENCE

This application is a continuation-in-part of co-pending application Ser. No. 29/131,131 filed Oct. 12, 2000.

FIELD OF THE INVENTION

The invention relates to decorative edging for gardens and around trees, and particularly to an edging system comprised of concrete bricks or tiles of different shapes adapted to be arranged in end-to-end relationship in different configurations to define the edge or border of a garden.

BACKGROUND OF THE INVENTION

A popular form of garden edging is comprised of concrete or cement bricks or tiles adapted to be arranged in such a manner as to form a circle around a tree trunk or to define or accent the edge or border of a garden. A well known edger is the scallop edger, which is comprised of long, narrow and relatively tall bricks or tiles having an undulating or scalloped top. The bricks are adapted to be partially buried in the earth in end-to-end relationship to comprise a border. Conventionally, the bricks or tiles are of three types, namely, straight units, curved units and corner units, to facilitate the formation of various edge configurations or designs.

The straight and curved units are typically 23 to 30 inches long, 2 inches thick and 5 to 8 inches tall, including the scallops which have a height of 1⅝ inches. Each unit weighs about 21 to 22 pounds. The corner units are typically 12"×12" and of the same thickness, height and weight as the curved and straight units. A long standing problem with prior edging units is that they are prone to breakage during manufacture and shipment, resulting in waste and economic loss. Also, existing edgers are heavy and not user friendly.

For shipment from factory to retailer, the units are packed side by side and stacked several layers thick on shipping pallets. Due to their sizes, the units frequently extend beyond the edges of conventional pallets and incur further damage during shipment and handling.

Figure 17:
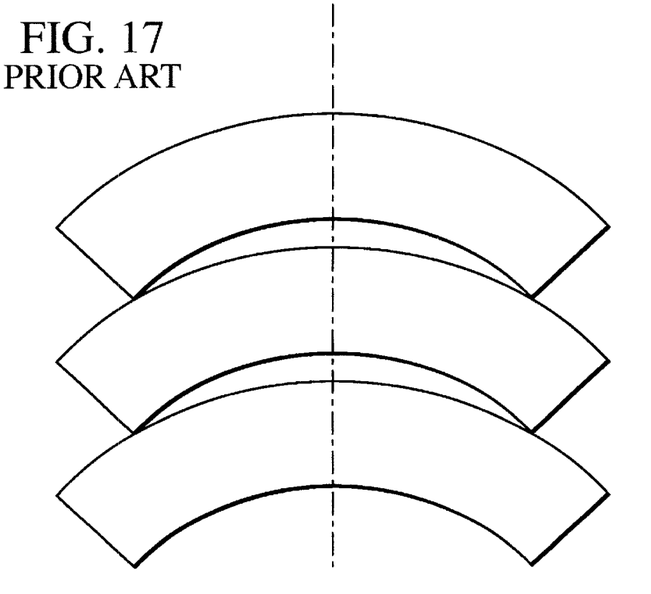
FIG. 17 is a contrasting plan view showing the packing arrangement of a plurality of prior art curved units.

Shipment and handling of the curved units is particularly troublesome. Conventionally, the curved units are formed with uniform thickness, defined by arcs with a single locus. The outer surface has a longer radius that the inner surface. Consequently, the units do not neatly nest together, and when packed for shipment are spaced apart at their centers, as is illustrated in FIG. 17. When multiple curved units are transported or handled (e.g., grasped by brick handling equipment such as a clamp cuber) the units will frequently break because of the spacing and lack of support at the mid-portions of the units.

Additionally, since the curved units cannot be fully nested, the number of units that can be loaded on a pallet is low. For example, a full pallet of straight units will typically contain 112 units, whereas a full pallet of curved units will typically contain only 72 units.

In arranging the units in a border design or pattern, the units customarily have flat ends which are simply abutted against one another. Therefore, after installation, the units are free to slip, slide and tilt relative to one another destroying the aesthetics of the edging pattern or design. To prevent this, various proposals have been made for mating male and female connectors on the ends of adjoining units (See, for example, U.S. Pat. Nos. 1,015,584 and 5,414,956). A drawback of male-female connectors is that only one side of a unit (e.g., male end) can connect with a given end of an adjoining unit (e.g., female end).

All in all, there is considerable room for improvement in the construction and design of concrete edging units.

OBJECTS OF THE INVENTION

An object of the invention is to provide totally redesigned and re-engineered concrete edging units overcoming the shortcomings and disadvantages of conventional units.

It is in particular an object of the invention to provide a reversible edging unit and improved concrete edging system facilitating a myriad of innovative layouts and designs. The bricks provided by the invention are no longer just an edger, but a complete three-piece design system.

Another object of the invention is to provide edging units that are small, light weight and user friendly, and that, when installed, do not shift or tilt.

A further object of the invention is to provide edging units that are strong, not prone to breakage and that pack together snugly for shipment to retailers and for convenient delivery to and handling by customers, such as home owners and do-it-yourselfers.

A still further object of the invention is to provide edging units, particularly curved edging units, that nest together in flush surface-to-surface engagement with one another, without gaps, so that a plurality of the units can be handled with little if any risk of breakage, and so that a large number of curved units can be loaded on a pallet.

SUMMARY OF THE INVENTION

In accordance with the invention, a three-piece edging system has been newly designed and engineered to provide curved and straight edging units having a length of about 12 inches, a thickness of about two and one-quarter inches, an overall height of about four and a half inches and a scallop height of about one inch. The significantly decreased ratios of length to thickness and height to thickness together with the increase in thickness produce an edging unit that is exceptionally strong and highly resistant to breakage. The weight of each straight unit is only 42 percent of the weight of a prior art straight unit (84 percent over a 24-inch length) and the weight of each curved unit is only 40.5 percent the weight of a prior art curved unit (81 percent over a 24-inch length). Given their smaller size and lighter weight, the units of the invention are much more user friendly and much more readily installed and with greater precision.

Due to their construction, the units of the invention have great stability when arranged in an edge or border design.

The corner units of the invention are similarly reduced in size and weight to six and a half by six and a half by two and a quarter by four and a quarter inches. The corner units have also been redesigned to facilitate stacking of the same and to mitigate against breakage during stacking and handling.

The curved units have in particular been redesigned to form the concave and convex surfaces on the same radius from different loci so that the two surfaces have the same arc of curvature and therefore nest together with the concave surface of one unit in flush face-to-face engagement with the convex surface of the next adjacent unit. A plurality of the curved units, even in a "green" or uncured state, may therefore be clamped in a clamp cuber and stacked on a pallet with little risk of damage. Also, the complete nesting of the curved units permits a much larger number of units to be stacked on a pallet.

The redesign of the units further facilitates palletizing of the units in snug relationship with one another and without overhanging the edges of the pallet.

Each of the units is provided at its ends with a connecting face comprising a vertical rib and an adjoining vertical groove such that the ribs on the connecting faces of two adjoining units fit within the grooves in the connecting faces of the two units, thereby connecting the units and mitigating against relative movement, e.g., tilting or shifting. The connecting faces on all three types of edge units, straight, curved and corner, are the same so that the connections therebetween are universal and facilitate a myriad of border or edge designs.

The invention therefore overcomes the shortcomings and disadvantages of conventional edging systems.

The foregoing and other advantages of the invention will become apparent to those of reasonable skill in the art from the following detailed description, as considered in conjunction with the accompanying drawings.

BRIEF DESCRIPTION OF THE DRAWINGS

FIGS. 15 A–K comprises a plurality of plan views illustrating a representative few of the myriad of edging designs that can be formed with the edging units of the invention;

DETAILED DESCRIPTION OF A PREFERRED EMBODIMENT

The following is a detailed description of preferred embodiments of the invention presently deemed by the inventor to be the best mode of carrying out his invention. The dimensions set forth herein for the three pieces or units of the edging system of the invention are the optimum dimensions for the units. Reasonable variations may be made within the skill of the art.

FIGS. 1, 2, 3 and 4 illustrate a preferred embodiment of the straight edging unit of the invention. The unit, indicated generally at 10, is preferably molded from a cementitious mixture, e.g., low or no slump concrete, and is comprised of a rectangular cubic body 12 and a scalloped top comprised of a plurality of scallops, preferably three scallops 14. The unit has a preferred length of 12 inches, a preferred thickness of two and one-quarter inches and a preferred overall height, including the scallops, of four and a quarter inches. Each scallop has a height of about one inch (31/32nds of an inch) and comprises an arc of a circle having a radius of about 59/64ths of an inch. The scallops are preferably spaced apart at a spacing of about one-half inch.

Regardless of specific dimensions, the length to thickness ratio of the straight units should be in the order of about, and preferably no more than about 5.33:1 and the height to thickness ratio should be in the order of about, and preferably no more that about 1.89:1.

At one of its ends, the body 12 of the unit 10 has a connecting face 15a comprised, from side to side of the unit, of a flat surface 16a, a vertical rib 17a, an adjacent vertical groove 18a and a flat surface 19a. At its other end, the body has a connecting face 15b comprised of a flat surface 16b, a vertical rib 17b, and an adjacent vertical groove 18b and a flat surface 19b, the purposes of which will be described later herein.

FIGS. 5, 6, 7 and 8 illustrate a preferred embodiment of a curved edging unit 20 provided pursuant to the invention. The unit 20 has a curvilinear cubic body 22 and a scalloped top comprised, preferably, of three scallops 24. The curved unit preferably has a length of about 12 inches (a linear length of about 11 and 23/64 inches), an overall height of four and one-quarter inches, and a thickness at each end thereof of two and one-quarter inches. As with the straight units, the length to thickness ratio of the curved units should be in the order of about, and preferably no more that about 5.33:1 and the height to thickness ratio should be in the order of about and preferably no more that about 1.89:1.

Figure 16:
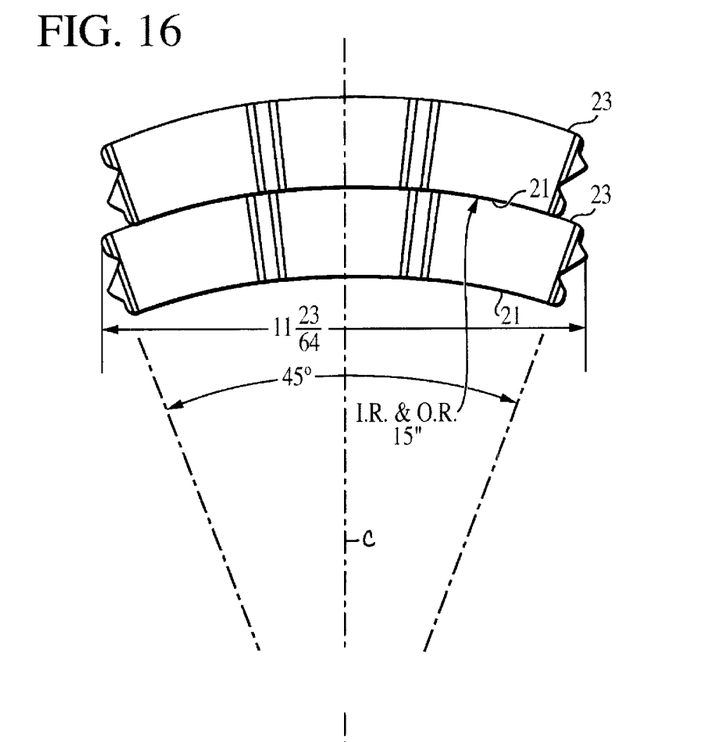
FIG. 16 is a plan view of a plurality of the curved units of the invention nested together for shipment or delivery to a customer.

The unit has a concave side 21 and a convex side 23, both of which are formed on the same radius from two different loci. In reference to FIG. 16, the preferred radius is 15 inches with the first locus (not shown) located on the centerline C of the arc about 15 inches from the concave surface and a second locus (not shown) located on the same center line C but 15 inches from each end of the convex surface of the unit. This results in a curved unit that is somewhat thicker in its mid-portion than at its ends which further contributes to the strength of the curved units. Most significantly, the concave and convex surfaces both have the same arc and degree of curvature so that a plurality of the units can be fully nested together with the concave surface of each unit engaged flush against the convex surface of the next adjacent unit, as is illustrated in FIG. 16. The arcuate extent of each surface is preferably 45 degrees.

At one of its ends, each curved unit has a connecting face 25a and at its other end a connecting face 25b. The connecting faces are the same as those on the straight units 10 and are comprised respectively of flat surfaces 26a–26b, vertical ribs 27a–27b, vertical grooves 28a–28b and flat surfaces 29a–29b.

FIGS. 9, 10, 11 and 12 depict a preferred embodiment of a corner edging unit 30 provided pursuant to the invention. Each corner unit 30 includes a corner block 31 and a pair of legs 32—32 extending at a right angle from the block. The legs are preferably of the same length and together with the corner block form outside walls or surfaces 33—33 having a length, preferably, of about six and a half inches, i.e., a six and a half by six and a half-inch corner. Each of the legs 32—32 preferably includes a single scallop 34 and the corner block a partial scallop 34a—34a. Like the other units, the legs are two and a quarter inches thick and have an overall height of four and a quarter inches including a one-inch tall scallop. Considered in terms of linear dimensions, the length to thickness and height to thickness ratios above described should not be exceeded.

The corner block 31 is a two and a quarter-inch square cube having an overall height of four and one-quarter inches. At the two sides thereof contiguous with the legs 32—32, the top of the cube is rounded off, preferably on a radius of about 3/32nds of an inch, to define a partial scallop 34a—34a adjacent each of the leg scallops 34. At its very top surface, the block is flat and defines a right-angle support area 40 spaced inwardly from the outer corner 31a of the block. The support area 40 facilitates safe and firm stacking of the units for shipment and enhances the stability of the stacked units. At its immediate outside corner 31a, the top of the block is curved to mitigate against chipping and to enhance the appearance of the corner unit.

As with the straight and curved units, the ends of the legs 32—32 of the corner unit comprise, respectively, connecting faces 35a–35b having flat surfaces 36a–36b, vertical ribs 37a–37b, vertical grooves 38a–38b, and flat surfaces 39a–39b, respectively.

Figure 1:
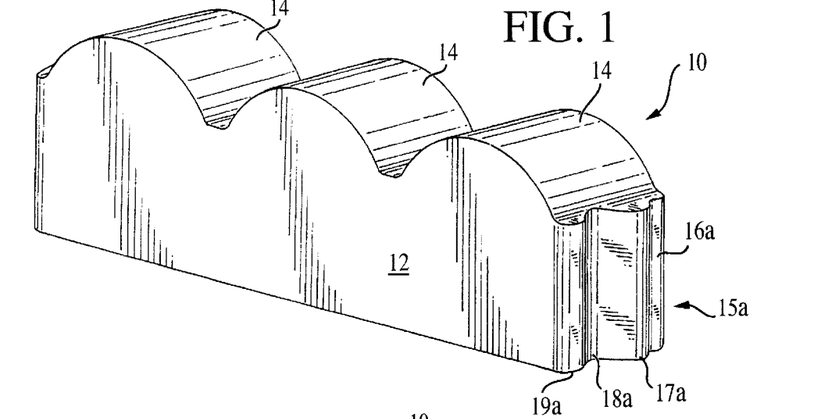
FIGS. 1, 2, 3 and 4 are, respectively, perspective, plan, side elevation and end views of a straight edging piece or unit of the invention.
Figure 2:
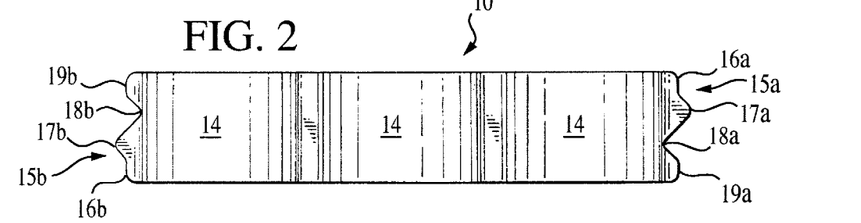
Figure 3:
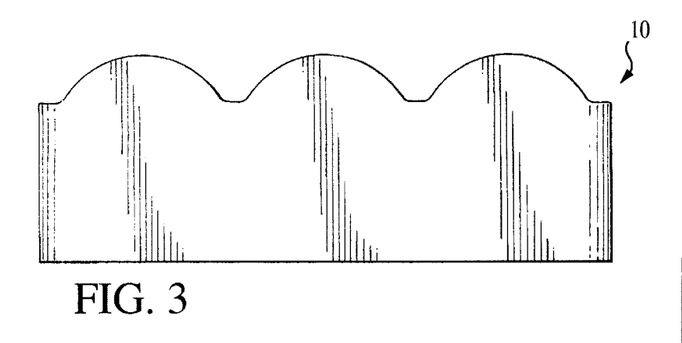
Figure 4:
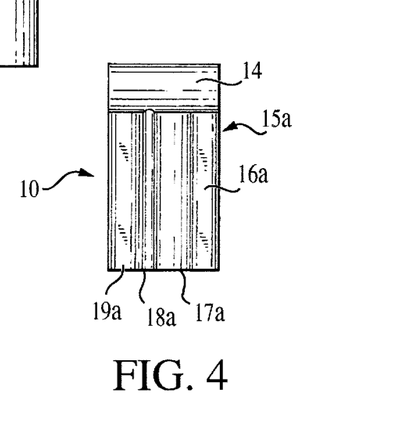
Figure 5:
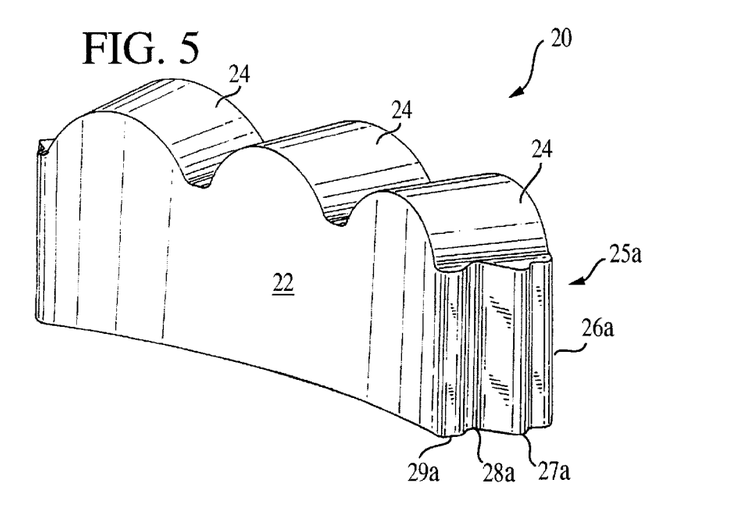
FIGS. 5, 6, 7 and 8 are, respectively, perspective, plan, concave side elevation and end views of a curved edging piece or unit of the invention.
Figure 6:
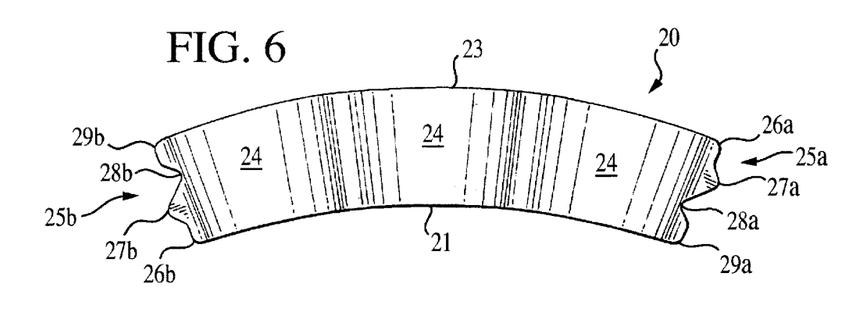
Figure 7:
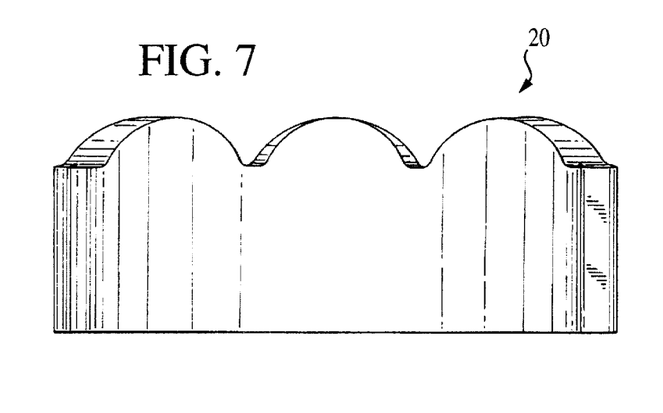
Figure 8:
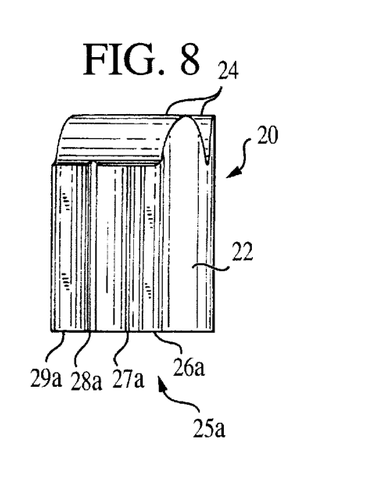
Figure 9:
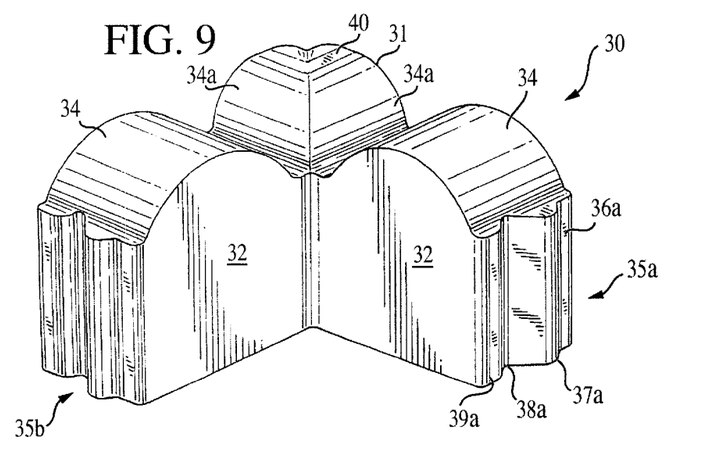
FIGS. 9, 10, 11 and 12 are, respectively, perspective, plan, and interior and exterior side elevation views of a corner piece or unit of the invention.
Figure 10:
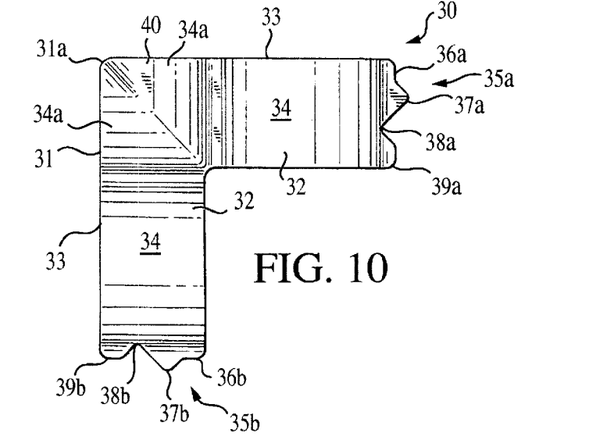
Figure 11:
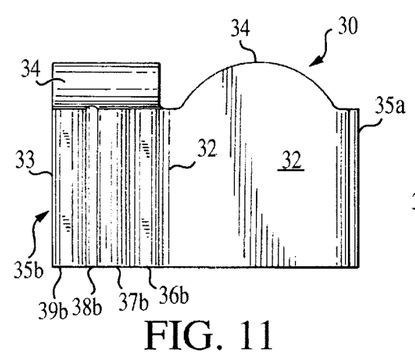
Figure 12:
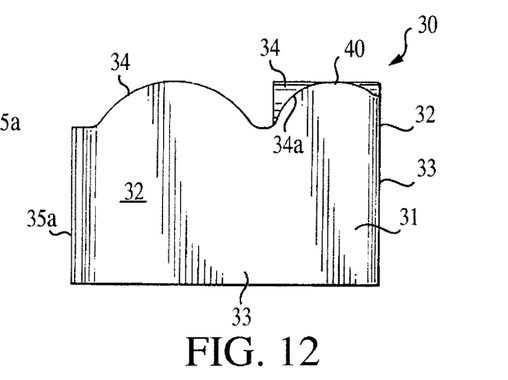
Figure 13:
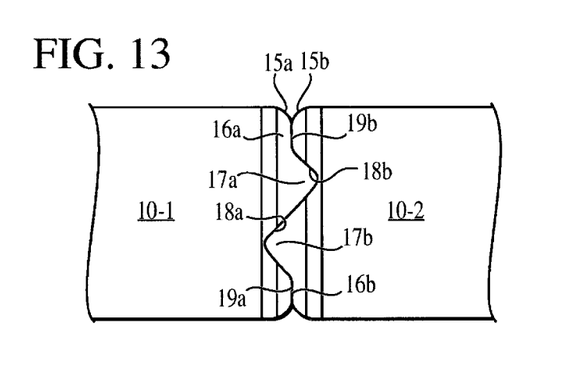
FIG. 13 is a fragmentary plan view illustrating the interconnection of two adjacent units, whether straight, curved or corner units.

FIG. 13 illustrates the manner in which the connecting faces of a pair of adjoining units cooperate with one another to maintain the two units in alignment, whether the units comprise two of the same unit or two different units, i.e., straight to straight, curved to curved, corner to corner, or straight to curved, or straight or curved to corner. As will be observed in each of FIGS. 2, 6 and 10, and having particular reference for the present to FIGS. 2 and 13, the connecting face 15a at one end of each unit has the rib 17a adjacent one side of the unit and the groove 18a adjacent the other side of the unit, whereas the other connecting face 15b has the rib 17b adjacent said other side of the unit and the groove 18b adjacent said one side of the unit. When a pair of the units are arranged end-to-end as shown in FIG. 13, the rib 17a on one end of a first unit 10-1 fits within the groove 18b on the opposite end of a second unit 10-2; the rib 17b on said opposite end of the second unit 10-2 fits within the groove 18a on said one end of the first unit 10-1; and the opposing pairs of flat surfaces 16a–19b and 19a–16b abut on another; thereby to prevent lateral displacement and/or tilting of one unit relative to the other. Thus, the two units are held in alignment with each other.

As is shown in the detailed illustration of FIG. 13, the ribs 17a–17b are generally V-shaped and have an axial protrusion of about one-quarter inch. The grooves 18a–18b are of a complementary V-shape and a complementary depth of about one-quarter inch. The flat surfaces 16a–16b and 19a–19b are also complementary. When properly assembled, all of the surfaces of the two faces are abutted against one another to mitigate relative shifting of the units. Also, the thick squat form of the units imparts stability to the assembly. Thus, once assembled, a border or edging made of the units will remain secure for a prolonged period of time.

Figure 14:
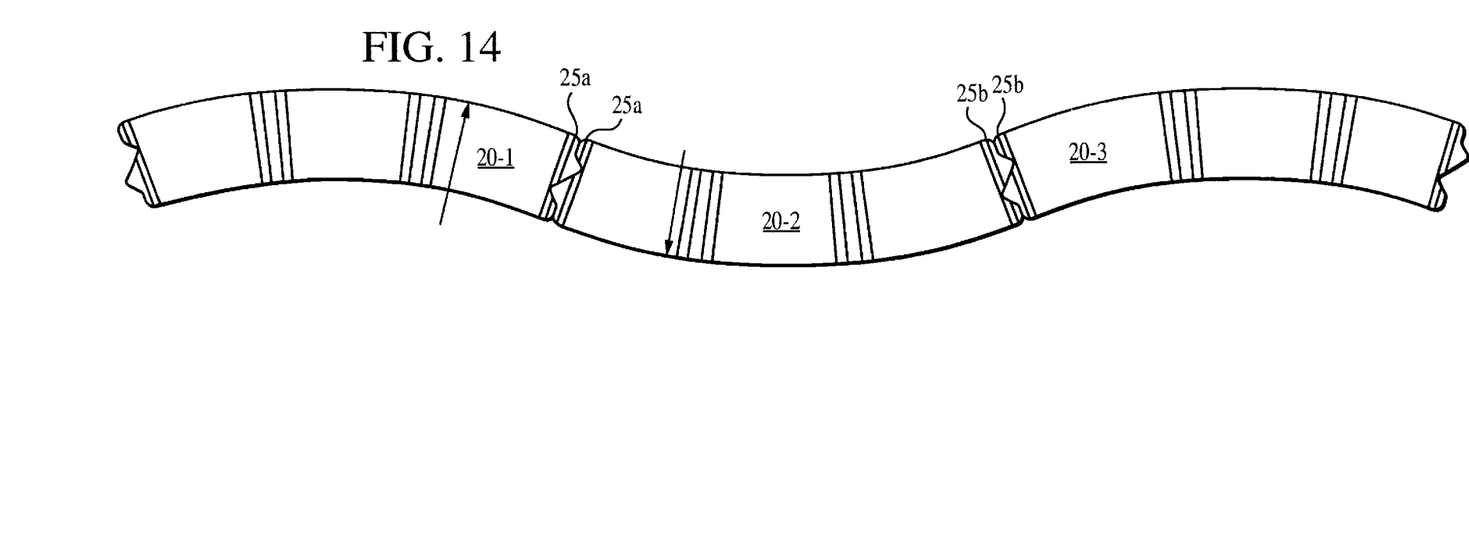
FIG. 14 is a plan view illustrating the interconnection of three curved units, where the two outboard units have their curves in the same direction and the middle unit has its curve in the opposite direction.

With the curved units, the direction of curvature of a border or edge may be reversed simply by end to end reversal of a next adjacent unit. For example, with reference to FIG. 14, the direction of curvature of a middle curved unit 20-2 may be made the reverse of the direction of curvature of a pair of outboard curved units 20-1 and 20-3 by reversing the middle unit end to end so that the connecting face 26a on the unit 20-2 mates with the connecting face 26a on the unit 20-1 and the connecting face 26b on the unit 20-2 mates with the connecting face 26b on the unit 20-3.

It is significant to notice that unit 20-2 is the same in all aspects to units 20-1 and 20-3. The end connectors are universal. They are both male and female and can interlock with either end of another unit. Thus, alternate reversal of a plurality of the curved units will produce an undulating or serpentine border. (See FIG. 15J.) Similarly, alternate reversal of a plurality of corner units will produce a zig-zag border, (See FIG. 15k).

Figures 15A, 15B, 15C, 15D, 15E, 15F, 15G, 15H, 15I, 15J, 15K:
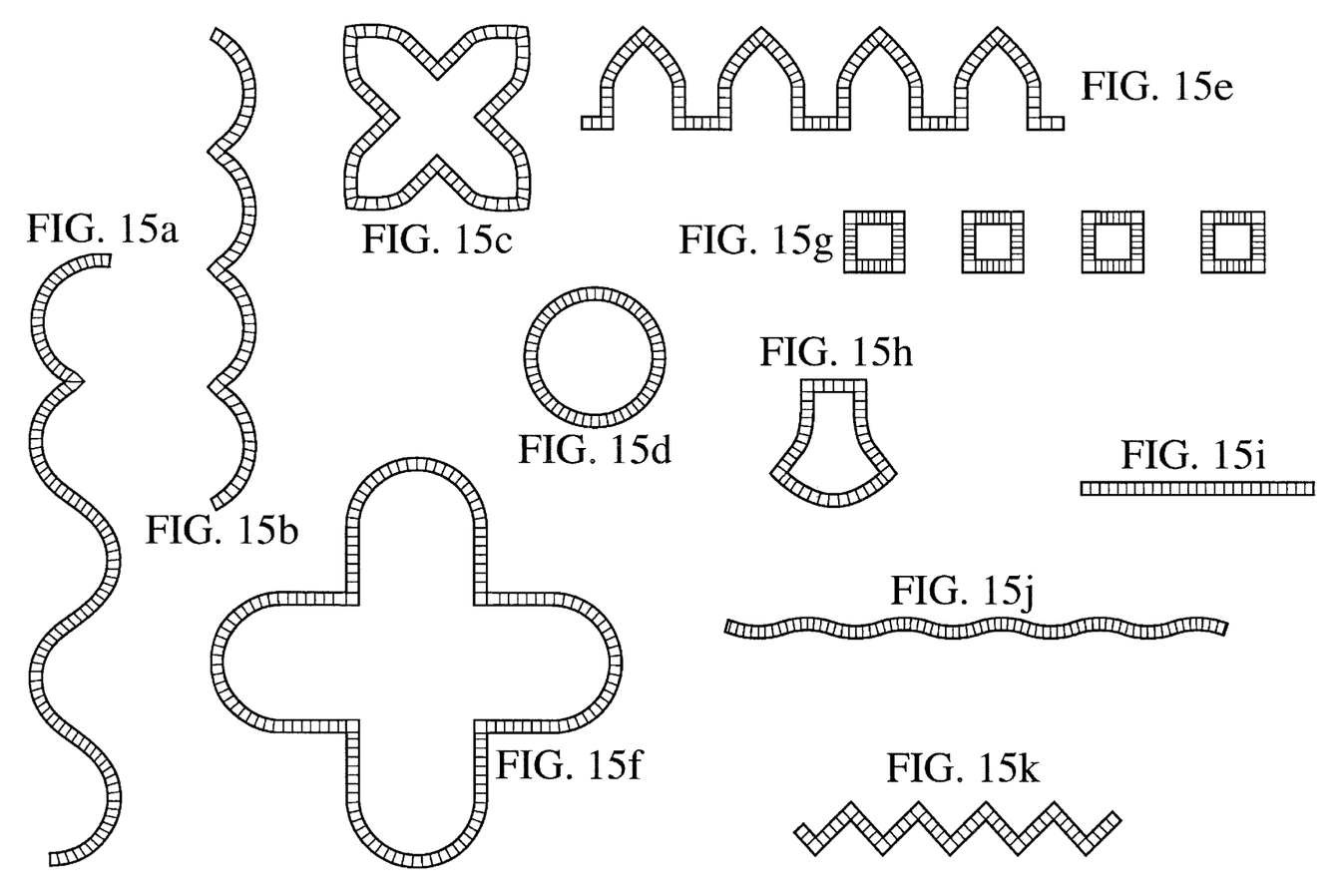

The edging units system of the invention is extremely versatile. The number of border or edge designs that can be made with the three edging units is limited only by the extent of human imagination. FIG. 15 illustrates, in sub-Figs. A–K, just a few of the potentially available designs.

FIG. 16 illustrates in detail the complete nesting of the curved units of the invention. Each unit preferably has an arcuate extent of 45 degrees, a lineal length of 11 and 23/64ths inches, and the inner and outer surfaces are both formed on a 15-inch radius from loci displaced 2 and 25/64ths inches from each other along the center line of the arc. The concave surface 21 of one unit engages the convex surface 23 of the next adjacent unit in surface-to-surface contact over their entire areas. The units thus support one another when grasped by a cuber or the like so that damage to or breakage of the curved units is mitigated to the maximum extent possible.

Figure 18:
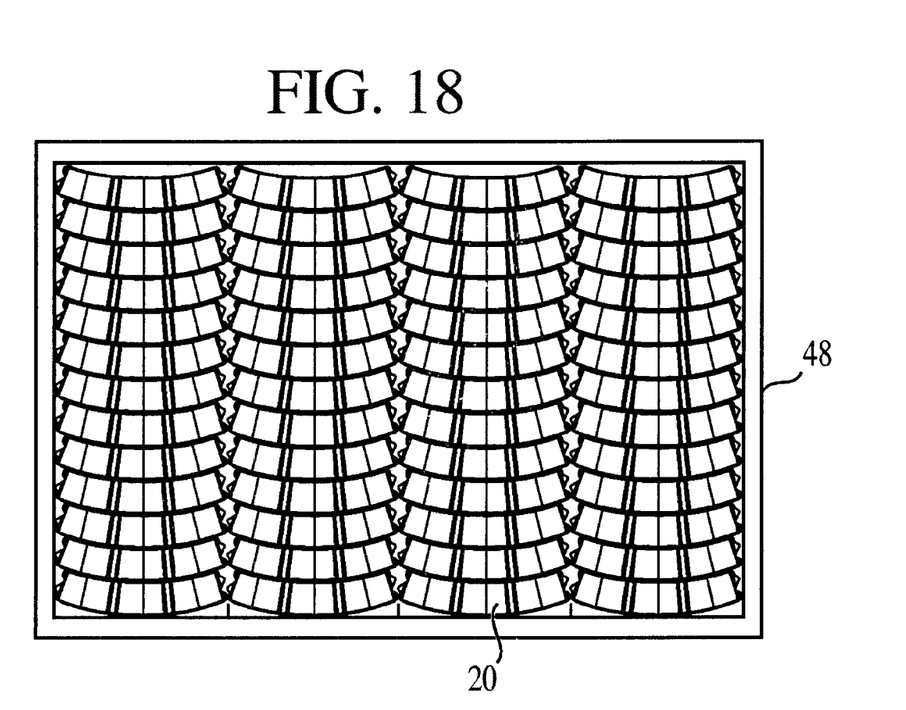
FIG. 18 is a plan view of 52 curved units stacked on a pallet.

Also, due to the complete nesting of the units, many more units can be packed on a pallet than with the design and construction of the curved units of the prior art. Just observe the contrast between FIGS. 16 and 17. FIG. 18 shows a standard 36 by 48 inch shipping pallet 48 on which are stacked 52 curved units 14 per layer. As shown in FIG. 18 all of the units are within the perimeter edges of pallet 48 thus reducing the potential for breakage. Preferably six layers are stacked on each pallet for a total of 312 units per pallet. One pallet thus securely holds more than 295 lineal feet of curved edging units, which is a significant increase over the prior curved edging systems.

The edging units or bricks of the invention are thicker and shorter than conventional, and the scallops are shorter and flatter. This results in a stronger brick that is more damage-resistant and that is more stable when installed in a yard or garden. Yet, the overall size and weight of each brick is lower and easier for the customer to handle. Each brick also has less material per lineal foot. Because the stout brick of the invention is less likely to break than the taller-thinner conventional brick, less Portland cement is required in the mix. Thus, savings are realized in the amount of material per lineal foot, the cost of the material, and significantly less breakage.

Figure 19:
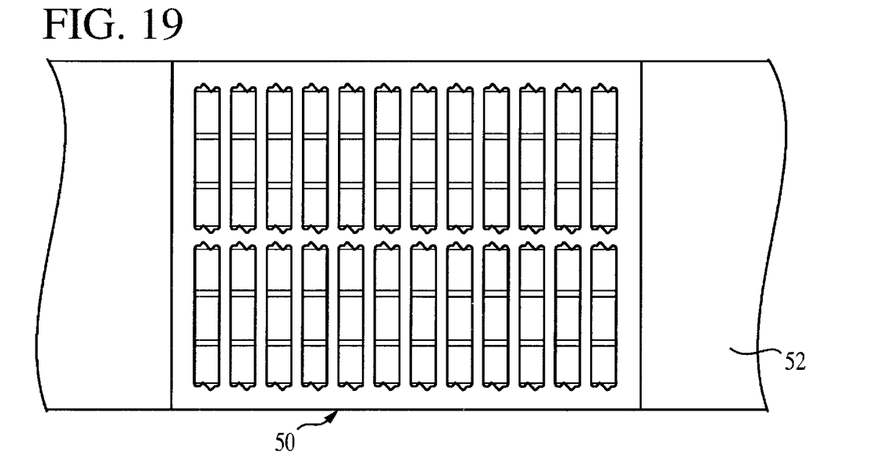
FIGS. 19, 20 and 21 are, respectively, plan views of the arrangement of molds used in the slip-form production of the straight, curved and corner units of the invention.
Figure 20:
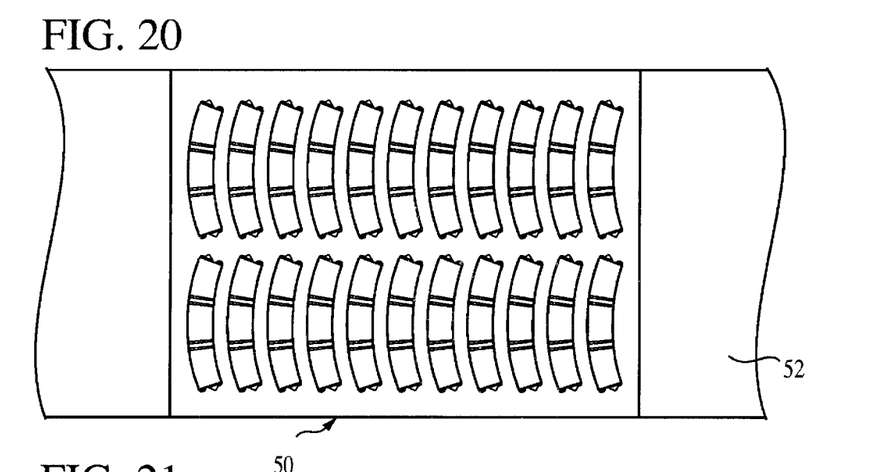
Figure 21:
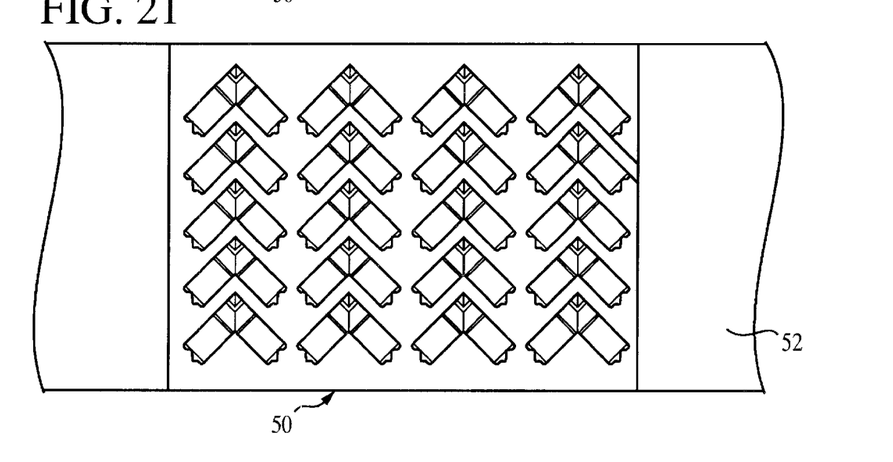

Because of the design and construction of the bricks, the molding process is significantly improved. The bricks are slip-form molded using forms having sidewalls defining the shape and size of the bricks and an open top and bottom. Referring to FIGS. 19, 20 and 21, a vertically reciprocable assembly 50 of forms of respective units is positioned above a horizontal pallet conveyor 52, and an assembly of plungers (not shown), which is vertically reciprocable independently of the assembly 50 of forms, is positioned above the assembly of forms. The assembly of plungers is complementary to the assembly of forms and each plunger has a downwardly facing scallop shoe for engagement within a respective form to form the scallop top of a respective unit. The sequence of operations is as follows:

1. A pallet is moved on the conveyor 52 to a location below the assembly 50 of forms;

2. The assembly of forms is lowered onto the pallet so that the lower ends of the forms are closed by the pallet;

3. The forms are filled with a concrete mixture, specifically low or no slump concrete;

4. The assembly of plungers is lowered so that the scallop shoe on each plunger enters into a respective form, compresses the concrete mixture in the form and forms the scallop on the top of the concrete mixture in the form;

5. With the plungers holding the tops of the bricks, the assembly of forms is raised vertically until the bottom of the assembly of forms is even with the bottoms of the plunger shoes;

6. The assemblies of forms and shoes are raised above the molded bricks.

7. The pallet of green bricks is conveyed downstream and a new pallet is conveyed below the mold assembly.

8. The mold and shoe are swept clean with brushes, and the foregoing operations are repeated. The wide, short molding forms and the flat scallop shoes are easy to sweep clean, which results in improved molding and better looking bricks.

The objects and advantages of the invention have thus been shown to be attained in a convenient, economical, practical and facile manner. While preferred embodiments of the invention have been herein illustrated and described, it is to be appreciated that certain changes, rearrangements and modifications may be made therein without departing from the scope of the invention as defined by the appended claims.

What is claimed is:

1. An edging system comprising (a) one or more straight units, (b) one or more curved units and (c) one or more corner units, said units being adapted for arrangement in end-to-end relationship, each said unit having a connecting face at each of its ends comprised of a vertical groove and a vertical rib such that the rib on each connecting face of any of said units fits within the groove in the connecting face of any other said unit to maintain the units in end-to-end alignment with one another, each said connecting face having substantially the same thickness, all of the connecting faces of all of said units connecting with any connecting face of any other said unit; and each of said curved units having a concave surface and a convex surface, the concave and convex surfaces having the same curvature such that a plurality of curved units may be nested together with the concave surface of each unit engaging flush against the convex surface of the next adjacent units and each of said curved units being thicker at its mid-portion than at its ends.

2. A system as set forth in claim 1 wherein the connecting face at one end of each unit has the rib thereon located adjacent one side of the unit and the groove therein located adjacent the other side of the unit and the connecting face at the other end of each unit has the rib thereon located adjacent said other side of the unit and the groove therein located adjacent said one side of the unit.

3. A system as set forth in claim 1, wherein said concave and convex surfaces are sides of the curved unit extending between the connecting faces on each end of the curved unit, said convex and concave curvature being arcuate and having the same radius.

4. A system as set forth in claim 1 wherein each corner unit comprises a corner block and a pair of legs of equal length extending at a right angle from the corner block, the corner block having a top including a flat surface spaced inwardly from an outer corner of the corner block.

5. A system as set forth in claim 4 wherein said flat surface on the top of the corner block is right-angle shaped, and the top of the outer corner is lower than the flat surface.

6. A system as set forth in claim 4 wherein the upper surface of each corner unit is scalloped, each of said legs comprising a scallop and the corner block comprising a partial scallop contiguous to and of the same height as the leg scallops, said flat surface comprising an area forming a right angle spaced inward from the outer corner of the block, the upper surfaces of the corner block contiguous to said outer corner being curved.

7. An edging system comprising a plurality of curved edger units, each having a concave surface and a convex surface, the concave and convex surfaces having the same curvature such that a plurality of curved units may be nested together with the concave surface of each unit engaging flush against the convex surface of the next adjacent unit, each said curved edger having ends of substantially the same thickness so that any end of any curved unit can mate with either end of any other said curved unit.

8. A system as in claim 7 wherein said concave and convex surfaces are sides of the curved unit.

9. A system as in claim 7 wherein said convex and concave surfaces are arcuate and have substantially the same radius of curvature.

10. A system as in claim 7 wherein each of said curved units has a connecting face on each of its ends, each connecting face carrying means for maintaining end-to-end alignment with adjacent units, each connecting face extending between said convex and concave surfaces, said alignment means on any connecting face mating with the alignment means carried by either connecting face of another curved unit.

11. An edging system including at least one corner unit, each corner unit comprising a corner block having an inside corner and an outside corner, and a pair of legs extending at a right angle from the corner block, the corner block having a top surface including a flat surface for facilitating stacking a plurality of corner units, said flat surface being spaced inwardly from both said inside and outside corners, the top of both said inside and outside corners being lower than said flat surface, wherein the upper surface of each corner unit is scalloped, each of said legs comprising a scallop and the corner block comprising a partial scallop contiguous to and of the same height as the leg scallops, said flat surface forming a right angle, the upper surfaces of the corner block between said flat surface and said inside and outside corners being curved.

12. A system as set forth in claim 11, further comprising curved units, wherein each of said curved units has a concave surface and a convex surface, the concave and convex surfaces having the same arc of curvature such that a plurality of curved units may be nested together with the concave surface of each unit engaging flush against the convex surface of the next adjacent unit.

13. An edging system comprising (a) one or more straight units, (b) one or more curved units and (c) one or more corner units, said units being adapted for arrangement in end-to-end relationship, each curved unit having a concave surface and a convex surface both formed on the same arc of curvature, each curved unit being thicker at its mid-portion than at its ends, each said unit having a connecting face of equal size and shape at each of its ends comprised of a vertical groove and a vertical rib and such that the ribs on the connecting faces of any pair of adjoining units fit within the grooves in the connecting faces of said pair of units to maintain the units in end-to-end alignment with one another.

14. A system as set forth in claim 13 wherein each said corner unit comprises a corner block and a pair of legs of equal length extending at a right angle from the corner block, the corner block having a top including a flat surface spaced inwardly from a lower outside corner of the corner block.

15. An edging system comprising (a) one or more straight units, (b) one or more curved units and (c) one or more corner units, said units being adapted for arrangement in end-to-end relationship, each said unit having a connecting face at each of its ends comprised of a vertical groove and a vertical rib such that the ribs on the respective connecting faces of any two of said units fit within the grooves in the opposite connecting faces of said two units to maintain the units in end-to-end alignment with one another, and wherein all of the connecting faces of all of said units connect with any connecting face of any other said unit; each of said curved units having a pair of spaced apart sides between said connecting faces, both of said sides having the same radius of curvature such that a plurality of curved units may be nested together; and each corner unit comprising a corner block and a pair of legs extending at a right angle from the corner block, the corner block having an outside corner, an inside corner and a top surface, said top surface including a right angle shaped flat surface spaced inwardly from the outside and inside corners, the flat area being higher than the outside and inside corners.

* * * * *